No. 12,807.

REISSUED JUNE 9, 1908.

E. BURT.

FILTER.

APPLICATION FILED JAN. 3, 1908.

2 SHEETS—SHEET 1.

Witnesses

R. L. Barnes

A. A. Bridges

Inventor,

Edwin Burt

By Davis & Davis,

Attorneys

No. 12,807. REISSUED JUNE 9, 1908.

E. BURT.

FILTER.

APPLICATION FILED JAN. 3, 1908.

2 SHEETS—SHEET 2.

Witnesses

R. H. Boswell.

C. R. Bridges

Inventor

Edwin Burt

By Davis & Davis

Attorneys

UNITED STATES PATENT OFFICE.

EDWIN BURT, OF EL ORO, MEXICO.

FILTER.

No. 12,807. Specification of Reissued Letters Patent. Reissued June 9, 1908.

Original No. 842,764, dated January 29, 1907, Serial No. 334,624. Application for reissue filed January 3, 1908. Serial No. 409,241.

*To all whom it may concern:*

Be it known that I, EDWIN BURT, a citizen of the United States, and a resident of El Oro, Mexico, have invented a new and Improved Filter, of which the following is a full, clear, and exact description.

This invention relates to high-pressure filters for precious-metal-ore slimes, as gold, silver, &c., having among other objects the production of an apparatus of this character of large capacity capable of filtering the slimes expeditiously and at a comparatively low cost.

With this and other objects in view one embodiment of the invention consists of a cylinder pivotally mounted in order to assume an inclined position at different periods of the filtering operation, the cylinder carrying a plurality of filtering mats swingingly suspended on its interior to separate the solid matter of the slime from the solution. Suitable devices are provided to feed the slime to the cylinder and conduct the solution from the mats and also treat them with different mediums before and during the time the solid matter which is caked on the mat is removed.

Reference is to be had to the accompanying drawings, forming a part of this specification, in which similar characters of reference indicate corresponding parts in all the figures.

Figure 1:
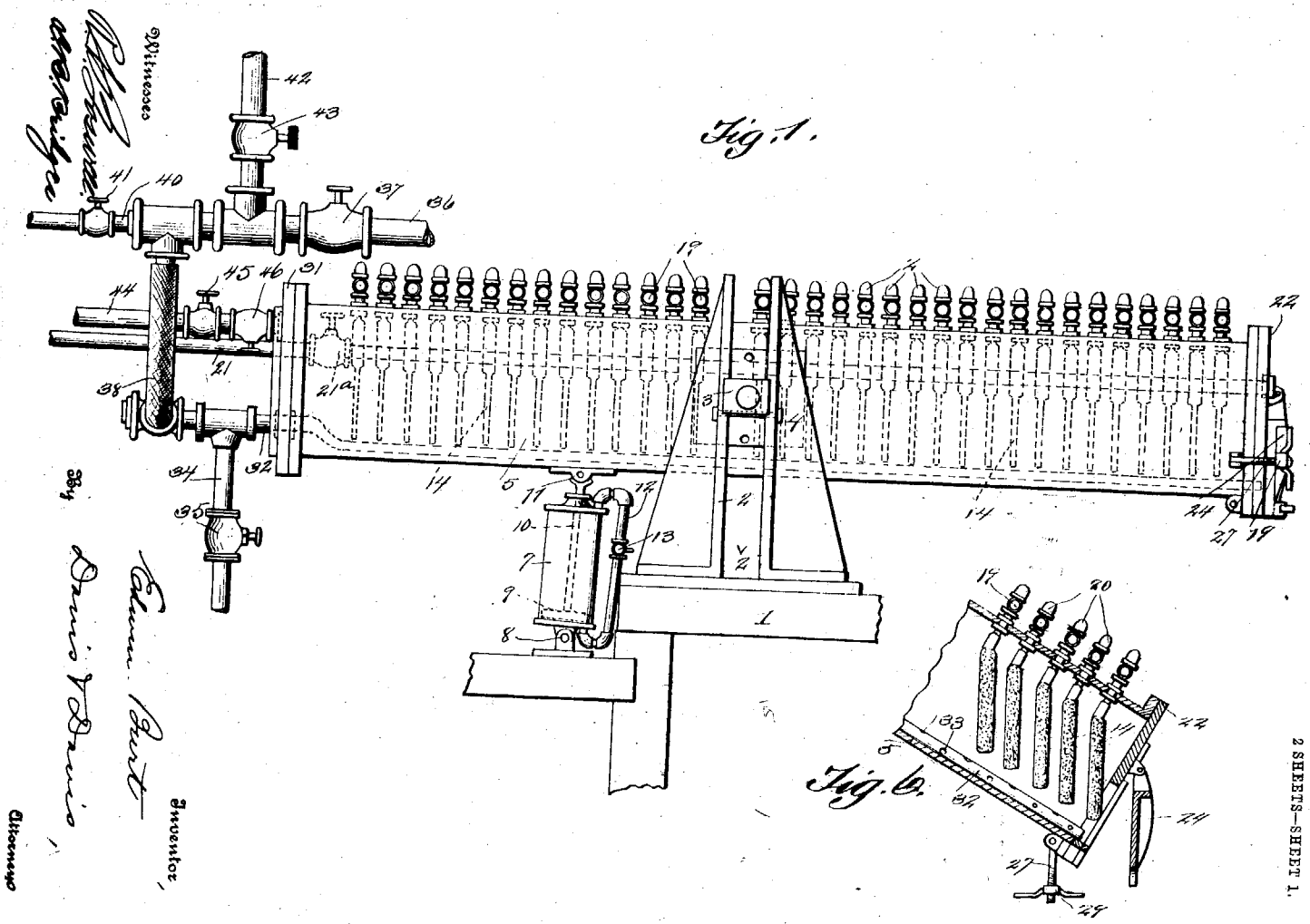
Figure 2:
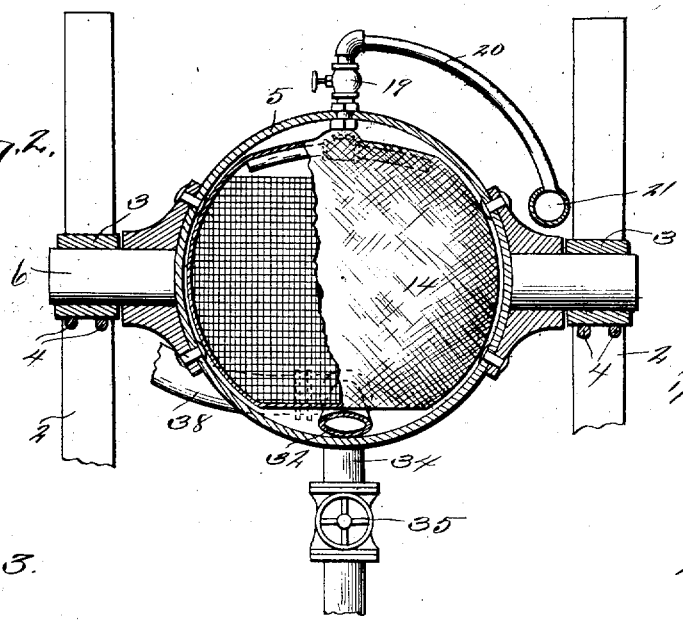
Figure 5:
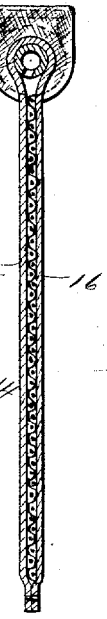
Figure 3:
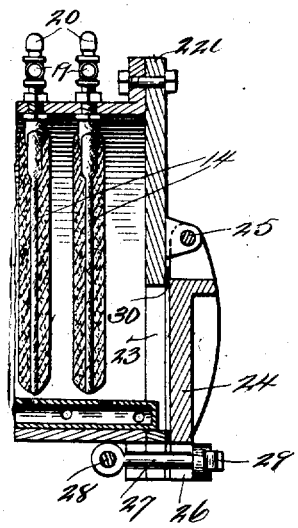
Figure 4:
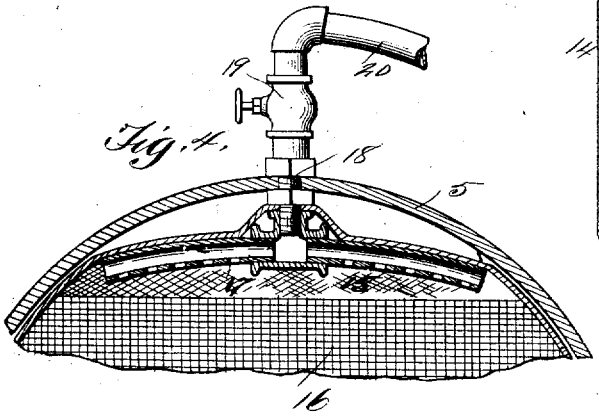

Figure 1 is a side elevation of the filter. Fig. 2 is a transverse vertical section on the line 2—2 of Fig. 1. Fig. 3 is a longitudinal vertical central section of the outer end of the filter, showing the solid matter of the slime caked on the mats. Fig. 4 is a transverse sectional view showing a fragment of one of the filter mats and its connection with the cylinder. Fig. 5 is a sectional view through one of the filter mats; and Fig. 6 is a fragmentary vertical sectional view of one end of the filter when tilted in an inclined position, showing the position assumed by the filter mats when the filter is disposed in this relation, the filter being shown with the solid matter of the slime caked thereon.

The numeral 1 indicates a platform or other suitable support on which are mounted two pairs of standards or guides 2, spaced apart for receiving journal-blocks 3, the latter being sustained in an adjusted position by bolts 4 passing through the guides. A cylinder 5, comprising the casing of the filter, has secured to it at its center at diametrically opposite points trunnions 6, journaled in the blocks 3. By this arrangement the cylinder is exactly balanced in a horizontal position on the standards and may be inclined with ease when desired. For turning the cylinder on its trunnions in order that it may assume an inclined position I preferably provide a cylinder 7, pivotally connected at 8 to any suitable support and carrying a piston 9, fixed to a piston-rod 10, the latter being pivotally connected at 11 to the under side of the filter casing. A supply pipe 12, leading to both ends of the cylinder, having a regulating valve 13, provides for the admission of compressed air, steam, or water to reciprocate the piston and force the filter to any desired angular position.

Suspended from the top of the filter cylinder 5 are a series of filter mats 14, said mats being preferably composed of a double thickness of canvas 15 or other filtering fabric, between the layers of which a core 16 of wire mesh is contained, the edges of the canvas being securely sewed together to embrace the core and prevent any leak of the slime at this point. The layers of canvas at each side of the mesh are further caught together at suitable points over the face of the mat, as in a quilt, to prevent their separation when removing the slime cakes.

As best shown in Figs. 4 and 5, the canvas 15 of each mat embraces a curved perforated pipe 17 at its upper end, this pipe 17 communicating at its center with a pipe 18, threaded or otherwise secured to the top of the filter casing. The wire core 16, covered by the canvas or other fabric 15, is substantially circular to fit the interior of the cylinder 5 and forms a hinge-like joint on the line of its upper end with the canvas, adapting the mats at all times to maintain a vertical position. Each of the pipes 18 passing from the mats is provided with a regulating valve 19, which in turn are each connected by a short pipe 20, all of which connect with a larger pipe 21, longitudinally arranged to the filter and passing to the solution tank or other receptacle provided for the solution extracted from the slime. A valve 21[a] (shown in dotted outline in Fig. 1) cuts off the communication between the tank and mats when desired.

The forward end of the cylinder 5 is provided with a cylinder-head 22, having an opening 23 at its lower end, which is normally covered by a door 24, pivotally connected to the head on a pin 25. The door 24 is constructed with a series of slots 26 about its outer edge, which aline with similar slots in the cylinder-head 22, as also the flange of the filter to which it is bolted, said slots being for the purpose of admitting bolts 27, pivoted at 28 to swing inwardly and engage the door 24 by means of thumb-nuts 29, threaded on their outer ends. A gasket 30 between the cylinder-head 22 and door 24 makes the joint therebetween water-tight.

The rear end of the cylinder 5 is provided with a heavily-constructed head 31, through which passes a supply pipe 32 for conducting the slime to the filter, said supply pipe extending the entire length of the filter under the mats 14 and being provided with perforations 33 throughout on its upper face. A pipe 34 connects with the pipe 32 and is provided with a valve 35, said pipe acting to draw from the filter any excess of slime, pulp, or wash-water. The pipe 32 also communicates with a pipe 36 through the intermediary of a hose 38 or other flexible connection. The pipe 36 has a valve 37 and leads the slime from any suitable source of supply to the filter and connects with an air-supply pipe 40, having a valve 41, and a water-supply pipe 42, having a valve 43. Also leading through the cylinder-head 31 is an air-supply pipe 44, having a cut-off valve 45, and a check-valve 46, said pipe acting to admit air directly into the filter for a purpose hereinafter made apparent.

In the operation of the filter the cylinder 5 can be held at any desired angle when charging it; but during this period it is preferably held in a horizontal position. The pulp or slime is fed through the pipe 36 and into the pipe 32 through the flexible connection 38, which conducts it to the interior of the cylinder and discharges it through the perforations 33, the valves 43, 41, and 35 at this time being closed. This feeding of the pulp continues under pressure usually ranging from sixty to ninety pounds for several minutes, which causes a cake of slime to form on each side of the filter mats while the filtered solution passes up between the core and through the pipe connections to the solution tank. When the desired thickness of solid matter has been caked on the mats, the feed-valve 37 is closed and the valve 35 opened. Compressed air is then admitted through the pipe 44 at a low pressure into the cylinder 5, causing the excess of slime or pulp to be forced out through the perforations in the pipe 32 and down the pipe 34. This air at the same time exerts a pressure on the slime cakes and keeps them from falling off. When the filter press is drained of the excess of slime, wash-water or solution is admitted through the pipe 42 by opening the valve 43, the compressed-air valve 45 being at this time closed and the valve 21ª leading to the solution tank being open. The wash-water filters through the slime cake, washing out any cyanid solution contained therein, and passes to the solution tank. After the cake has been washed sufficiently the excess of water is forced out by opening the compressed air valve 45, and if the cakes are to be dried the air-pressure is maintained in the press for several minutes. The air is then cut off, the door 24 opened, and the press tilted by admitting air or steam to the bottom of the piston 9, reciprocating in the cylinder 7. This causes the mats to swing to the vertical position shown in Fig. 6, thereby enlarging the space between them and the bottom of the cylinder of the filter-casing. Steam, air, or water is then passed through the solution pipe 21, causing the cakes to drop from the mats and slide out of the press. The press is then brought to a horizontal position and the filtering operation repeated.

Although I have particularly described the invention in detail, it is to be understood that the precise embodiment is not material, since the scope of the invention is limited by the annexed claims only.

It will be observed that a feature of great importance lies in so arranging the casing and the mats that the maximum filtering capacity is obtained with a casing of a given capacity and at the same time the casing is rendered self-discharging. This result is obtained by so suspending the mats within the casing that they shall have the greatest possible length with a given depth of facing and thus afford the maximum filtering surface with a casing of a given length and depth, the mats being so constructed and arranged that they all incline, at least while discharging, toward the discharge end of the casing. This arrangement gives to each mat the greatest possible length and filtering surface with a given clearance space below for the free movement of the deposits to the discharge opening. This arrangement is advantageous for the further reason that a greatly elongated casing and a long rank or battery of mats may be employed, thus greatly increasing the capacity of the filter with a minimum increase in the size of the casing and without destroying the self-discharging capacity of the casing.

Having thus described my invention, I claim as new and desire to secure by Letters Patent:—

1. In a filter, a cylinder, trunnions carried by the cylinder, supports in which the trunnions are journaled, a series of filter mats contained in the cylinder, a pipe connecting all of said mats, means for supplying the cylinder with an ore slime, and means for turning the cylinder to an inclined position on its trunnions.

2. In a filter, a casing, a plurality of filter mats contained in the casing, means for supplying the casing with an ore slime, and means for tilting the casing in an inclined position.

3. In a filter, a casing, a door at one end of the casing, filter mats contained in the casing, means for supplying the casing with a slime or the like, and means for tilting the casing to an inclined position.

4. In a filter, a cylin 'rical casing, a series of filter mats contained therein, a solution pipe, means connecting all of said mats to the solution pipe, a door at one end of the casing, means for feeding slime to the casing at its opposite end, and means for tilting the casing to an inclined position.

5. In a filter, a casing, trunnions carried by the casing, a support in which the trunnions are journaled, a series of filter mats contained in the casing, a pipe with which all of said mats communicate, means for tilting the casing to an inclined position, and means for opening one end of the casing, as described.

6. In a filter, a casing, a series of filter mats contained therein, said mats being composed of a perforated core covered with a filtering material, means for tilting the casing to an inclined position, and means adapting the mats to remain vertical when the casing is thus tilted.

7. In a filter, a cylindrical casing, a series of filter mats arranged parallel to each other contained therein, a pipe communicating with all of said mats, means for tilting the casing to an inclined position, a door at one end of the casing, and a pipe system adapted to feed to the casing slime, air and water during the filtering operation, as described.

8. In a filter, a cylindrical casing, a plurality of perforated pipes secured to the casing, a filter mat suspended from each pipe, a pipe communicating with the filter mats, means for tilting the casing to an inclined position, means adapting the casing to be opened, and means to feed to the casing slime or the like to be filtered.

9. In a filtering apparatus of the type set forth, the combination of an elongated self-discharging casing having a discharge opening at its lower end in line with the bottom of the casing, said bottom inclining toward the discharge opening, means for introducing the liquid to be filtered and for discharging the unfiltered liquid, hollow filtering mats suspended in the casing and having pipes connected thereto for conducting therefrom the filtered liquid, said mats hanging vertically at an angle to the bottom of the casing terminating short of the bottom of the casing to leave a discharge space in line with said discharge opening.

10. In a filtering apparatus of the type set forth, a casing inclining downwardly beyond the angle of repose its full length, so as thereby to be self-discharging, said casing being provided with a discharge opening at its lower end, a closure for this opening, means for introducing and removing the liquid to be filtered, a series of hollow filtering mats suspended within the casing from the top thereof, these mats being suspended vertically so as to thereby stand at an inclination to the bottom and terminating short of the bottom of the casing so as to leave a discharging space below the mats in line with the dis charge opening, and means for conducting away the filtered liquid from these mats.

In testimony whereof I have signed my name to this specification in the presence of two subscribing witnesses.

EDWIN BURT.

Witnesses:

THOS. J. MURPHY,

CHARLES DAWSON BURNETTE.